United States Patent
Povirk et al.

(10) Patent No.: US 10,221,903 B2
(45) Date of Patent: Mar. 5, 2019

(54) VEHICLE WITH WHEEL-END DISCONNECT AND ASSOCIATED CONTROL METHOD

(71) Applicant: Ford Global Technologies, LLC, Dearborn, MI (US)

(72) Inventors: Jacob Martin Povirk, Franklin, MI (US); Mikhail Steinberg, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 15/015,556

(22) Filed: Feb. 4, 2016

(65) Prior Publication Data

US 2017/0227074 A1   Aug. 10, 2017

(51) Int. Cl.
  *B60K 17/346* (2006.01)
  *F16D 48/06* (2006.01)
  *B60K 25/06* (2006.01)

(52) U.S. Cl.
  CPC ............ *F16D 48/06* (2013.01); *B60K 17/346* (2013.01); *B60K 25/06* (2013.01); *F16D 2500/10425* (2013.01); *F16D 2500/10431* (2013.01); *F16D 2500/50287* (2013.01)

(58) Field of Classification Search
  CPC .................... B60K 17/346; F16D 2500/10431
  See application file for complete search history.

(56) References Cited

U.S. PATENT DOCUMENTS

| 5,033,329 | A | * | 7/1991 | Tezuka | B60K 23/04 475/150 |
|---|---|---|---|---|---|
| 5,033,575 | A | | 7/1991 | Takeshita et al. | |
| 6,121,895 | A | * | 9/2000 | Beeson | B60T 8/172 340/444 |
| 8,156,843 | B2 | | 4/2012 | Povirk et al. | |

(Continued)

FOREIGN PATENT DOCUMENTS

| FR | 2958590 A3 | 10/2011 |
|---|---|---|
| KR | 1020090093146 A | 9/2009 |
| KR | 101441816 B1 * | 10/2014 |

OTHER PUBLICATIONS

Functional Safety for Automotive System Development, 2013 Ford Escape Debuts New AWD with JTEKT Torque Coupling, SAE Internatonal, Jun. 12, 2012, 2 pages.

(Continued)

*Primary Examiner* — Tisha D Lewis
(74) *Attorney, Agent, or Firm* — James Dottavio; Brooks Kushman P.C.

(57) ABSTRACT

One vehicle wheel is disconnected from a differential while the vehicle is in a front wheel drive mode. A controller checks for a malfunction of the differential while the vehicle is in the front wheel drive mode and in response to a request to enter an all wheel drive mode. If speeds of the other vehicle wheel and the differential input indicate that the malfunction is present, the all wheel drive mode is disabled and the driver is informed. If fluid temperature indicates a risk of the malfunction, all wheel drive mode is temporarily (Continued)

disabled and the driver is informed. If the temperature condition continues to be present for a predetermined duration, the all wheel drive mode is disabled.

12 Claims, 4 Drawing Sheets

(56) References Cited

U.S. PATENT DOCUMENTS

| | | | | |
|---|---|---|---|---|
| 2005/0064993 | A1* | 3/2005 | Ginther | B60K 23/04 |
| | | | | 477/166 |
| 2007/0265756 | A1* | 11/2007 | Joyce | B60T 8/172 |
| | | | | 701/51 |
| 2010/0076645 | A1* | 3/2010 | Buchhold | F16H 61/12 |
| | | | | 701/30.3 |
| 2016/0152238 | A1* | 6/2016 | Mita | B60K 23/0808 |
| | | | | 180/197 |

OTHER PUBLICATIONS

Nissan Rogue 2014 Owners Manual, 442 pages.
Instrument Panel, Learn About the Indicators, Gauges and Displays Related to Driving the Vehicle, 1 page.
Nissan Suv Manuals, AWD Warning Light, Starting and Driving: Nissan Murano 2009-2015 Owners Manual, http://www.nisuv.com/nicont-433.html, 3 pages.
5-2. Steps to Take in an Emergency, If a Warning Light Turns on or a Warning Buzzer Sounds . . . , 85 pages.

* cited by examiner

VEHICLE WITH WHEEL-END DISCONNECT AND ASSOCIATED CONTROL METHOD

TECHNICAL FIELD

This disclosure relates to the field of vehicle driveline controls. More particularly, the disclosure pertains to a method of controlling an all wheel drive powertrain with a wheel end disconnect.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four vehicle improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear axles while permitting slight speed differences between the axles as the vehicle turns a corner. A RWD configuration is adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front axles while permitting slight speed differences between the axles as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes a TOD clutch that, when engaged drives a rear differential that, in turn, drives left and right rear axles.

SUMMARY OF THE DISCLOSURE

A vehicle includes a differential, first and second wheels, and a controller. The first wheel is fixedly coupled to a first axle shaft. The second wheel is selectively coupled to a second axle shaft by a clutch. To reduce parasitic losses, the controller disengages the clutch to decouple the second wheel from the second axle shaft while the vehicle is in a front wheel drive mode. In response to a request to enter an all wheel drive mode, the controller engages the clutch if a ratio of a speed of a differential input to a speed of the first axle shaft is less than a first threshold. If the ratio exceeds the first threshold, the controller inhibits engagement of the clutch. The differential may also include a temperature sensor. The controller may inhibit engagement of the clutch if the temperature sensor indicates a temperature exceeding a second threshold. If the temperature then decreases to less than the second threshold, the controller may engage the clutch. If the temperature remains above the second threshold for more than a predetermined duration, the controller may not engage the clutch even when the temperature does decrease to less than the second threshold. The controller may display a message to the driver when it inhibits engagement of the clutch, whether due to the ratio exceeding the first threshold or due to the temperature exceeding the second threshold. The controller may also inhibit engagement of a power-take-off unit.

A method of operating a vehicle includes disengaging a clutch in front wheel drive mode and engaging the clutch in response to a request to enter all wheel drive mode only under specified conditions. Disengaging the clutch decouples a rear wheel from a first rear axle. Engagement of the clutch is inhibited if a ratio of a rear differential input speed to a speed of a second rear axle exceeds a first threshold. Engagement of the clutch is also inhibited if a differential fluid temperature exceeds a threshold. The controller may also display a message to a driver.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
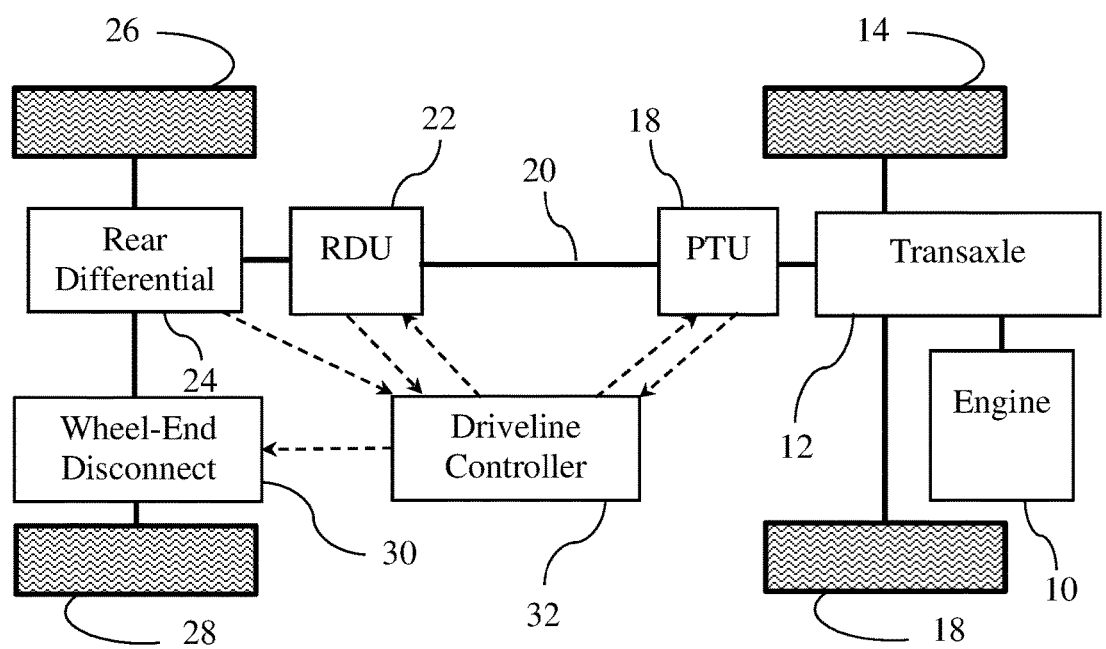
FIG. 1 is a schematic diagram of a vehicle powertrain.

FIG. 1 schematically illustrates an all-wheel drive vehicle powertrain. The heavy lines indicate the flow of mechanical power, whereas the dashed lines indicate the flow of information. An internal combustion engine 10 generates mechanical power by converting stored chemical energy in a fuel source. Transaxle 12 adapts the speed and torque of the mechanical power produced by the engine to suit the current needs of the vehicle. Transaxle 12 includes a multiple-ratio gearbox and also a front differential that provides roughly equal torque to left and right front wheels 14 and 16 while accommodating slight differences in speed such as when the vehicle turns a corner. A Power Take-off Unit (PTU) 18 selectively driveably connects the output of the multiple-ratio gearbox of transaxle 12 to driveshaft 20. Rear Drive Unit (RDU) 22 selectively transmits power from driveshaft 20 to rear differential 24. Rear differential 24 transmits roughly equal torque to left and right rear wheels 26 and 28 while accommodating slight differences in speed. Wheel-end disconnect 30 includes a controlled clutch that selectively couples or decouples right rear wheel 28 from the corresponding side of rear differential 24.

Wheel-end disconnect 30 and the PTU disconnect may be synchronizers that include friction clutches with sufficient torque capacity to bring the components to the same speed before engaging a positive engagement dog clutch. Alternatively, one of them may be only a dog clutch and the RDU clutch may be used to synchronize the speeds before engagement. Alternatively, engagement may be limited to times when the vehicle is stationary.

Controller 32 adjusts the state if several components including PTU 18, RDU 22, and wheel-end disconnect 30. Specifically, when the vehicle is in a Front Wheel Drive (FWD) operating mode, controller 32 signals PTU 18 to disconnect driveshaft 20 from transaxle 12 and signals wheel-end disconnect 30 to disconnect the right rear wheel from rear differential 24. By so doing, the driveshaft can remain stationary as the vehicle moves, reducing the parasitic drag associated with driveshaft rotation and improving fuel economy. When the vehicle is in an All Wheel Drive (AWD) operating mode, the controller signals PTU 18 and wheel-end disconnect 30 to drivably connect the corresponding components. Then, controller 32 monitors vehicle traction and signals RDU 22 to transmit power from driveshaft 20 to rear differential 24 when it detects a low of traction at the front wheels. Controller 32 may also signal RDU 22 to complete this power flow path in advance of maneuvers that are likely to cause loss of front wheel traction. Controller 32 may receive input signals from other components such as PTU 18, RDU 22, and rear differential 24. Controller 32 may be a stand-along driveline controller and may be integrates into another controller such as a transaxle controller or powertrain controller.

Figure 2:
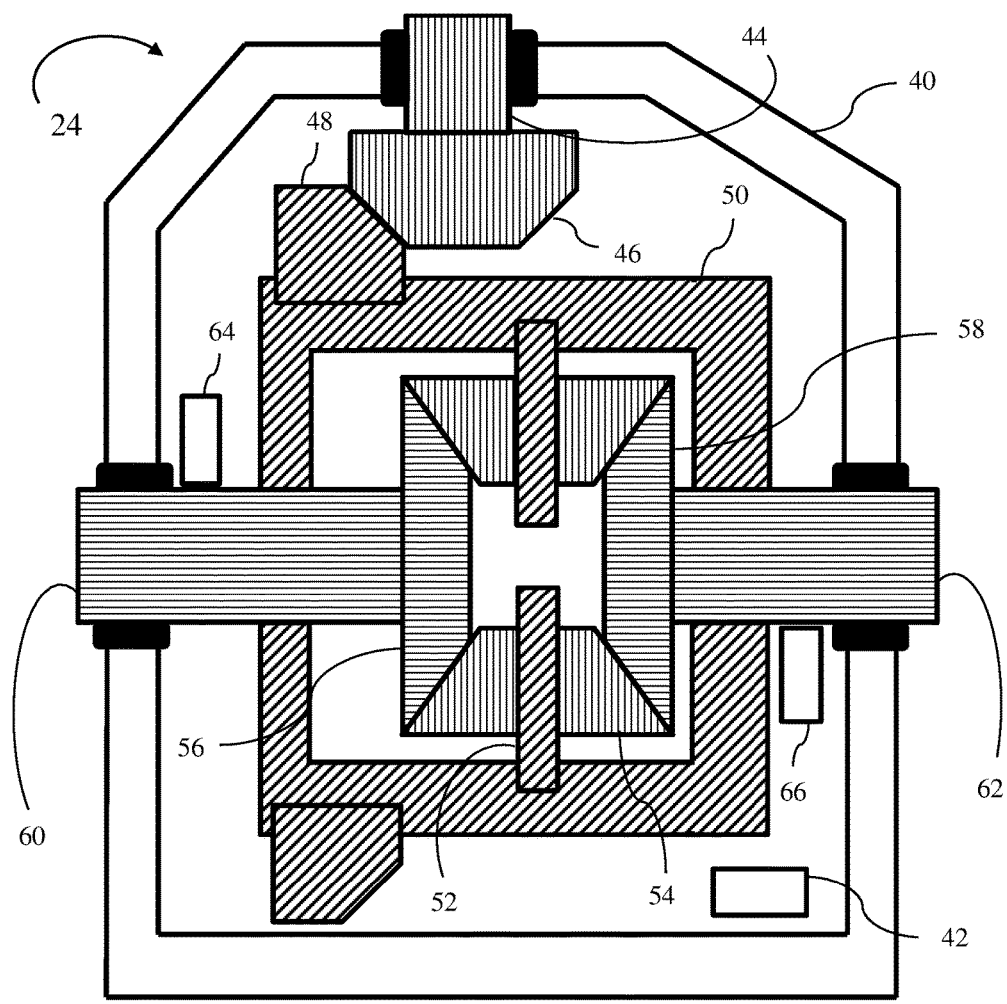
FIG. 2 is a schematic cross section of a rear differential suitable for use in the powertrain of FIG. 1.

FIG. 2 illustrates the structure of rear differential 24. The differential is encased in a housing 40. In vehicles with independent rear suspension, housing 40 is fixed to vehicle structure. In vehicles with a solid rear axle, housing 40 is suspended and moves with the axles. The housing does not rotate in either type of vehicle. Housing 40 is partially filled with fluid the provides lubrication to moving components and convects heat generated by friction between components to the housing, from which the heat is dissipated. Temperature sensor 42 sends an electronic signal to the controller indicating the temperature of the fluid.

Power enters the rear differential from the RDU via stub shaft 44 which is fixed to drive pinion 46. Drive pinion 46 is in continuous meshing contact with ring gear 48. The axes of rotation of pinion 46 and ring gear 48 are offset by 90 degrees. They may also be vertically offset, in which case hypoid gear geometry is common. Ring gear 48 is fixed to differential carrier 50. A number of planet shafts 52 are fixed to an interior of differential carrier 50. A number of beveled planet gears are supported for rotation with respect to each of the planet shafts. Alternatively, the planet gears could be fixed to the planet shafts and the planet shafts could rotate with respect to the carrier. Each of the beveled planet gears 54 mesh with a left side gear 56 and a right side gear 58. The left side gear is fixed to a left axle shaft 60 while the right side gear is fixed to a right axle shaft 62.

When the vehicle is traveling in a straight line with wheel-end disconnect 30 engaged, differential carrier 50, left axles shaft 60, and right axle shaft 62 rotate at the same speed and in the same direction. In this condition, there is no motion among the planet gears 54, the side gears 56 and 58, and the planet shafts 52. Stub shaft 44 rotates at a speed proportional to the speed of differential carrier 50 with the ratio determined by the tooth counts of pinion gear 46 and ring gear 48. When the vehicle turns to the left, left axle shaft 60 rotates slightly slower than differential carrier 50 and right axle shaft 62 rotates slightly faster than differential carrier 50. Planet gears 54 rotate about planet shafts 52 at a speed proportional to the difference in speed between left axle 60 and right axle 62. Speed sensors 64 and 66 send electronic signals to the controller indicating the rotational speeds of left axle shaft 60 and right axle shaft 62 respectively. Due to the speed relationships among components, two sensors are sufficient to calculate the speeds of all rotating components within the differential. Alternatively, one or both speed sensors could sense the speed of a different component and the controller could calculate the speed of each axle shaft based on speed relationships.

When wheel-end disconnect 30 is disengaged, the speed of left axle shaft 60 is proportional to vehicle speed, but the speeds of other components are determined by parasitic drag. Generally, because the drag on components linked to differential carrier 50 is greater than the drag on components linked to right axle 62, carrier 50 will be stationary. With differential carrier 50 stationary, right axle shaft will rotate at the same speed as left axle shaft but in the opposite direction. Planet gears 54 rotate with respect to planet shafts 52 at relative speeds much higher than during connected speed differentiation. Furthermore, this condition may be maintained for much longer periods of time than the duration of turning maneuvers.

During this high planet gear relative speed operation, some heat is generated by friction between the planet gears and the planet shafts. If fluid is flowing past this interface, the quantity of heat generated in substantially reduced due to the lubrication effect and that heat effectively removed from the area by movement of the fluid. However, if fluid is not flowing past this interface for some reason, a large amount of heat is generated making the components in the vicinity of the interface extremely hot. When the relative motion ceases, for example because the vehicle momentarily stops, the planet pinions may become effectively welded to the planet shafts. Fluid flow may be interrupted for a couple of reasons. If there is a leak in housing 40, the quantity of fluid decreases. The differential carrier 50 may stop in a position in which one of the planet shafts and corresponding planet pinion is above the fluid level.

If this welding phenomenon occurs, then differential carrier 50, left axle shaft 60, and right axle shaft 62 are constrained to rotate at the same speed. When wheel-end disconnect 30 is disengaged, this results in a slight increase in parasitic drag which is not a serious detriment to vehicle operation. However, if wheel-end disconnect 30 is engaged, then left rear wheel 26 is constrained to rotate at the same speed as right rear wheel 28. In this condition, one or both wheels are likely to lose traction when the vehicle turns, which could result in under-steer or over-steer.

Figure 3:
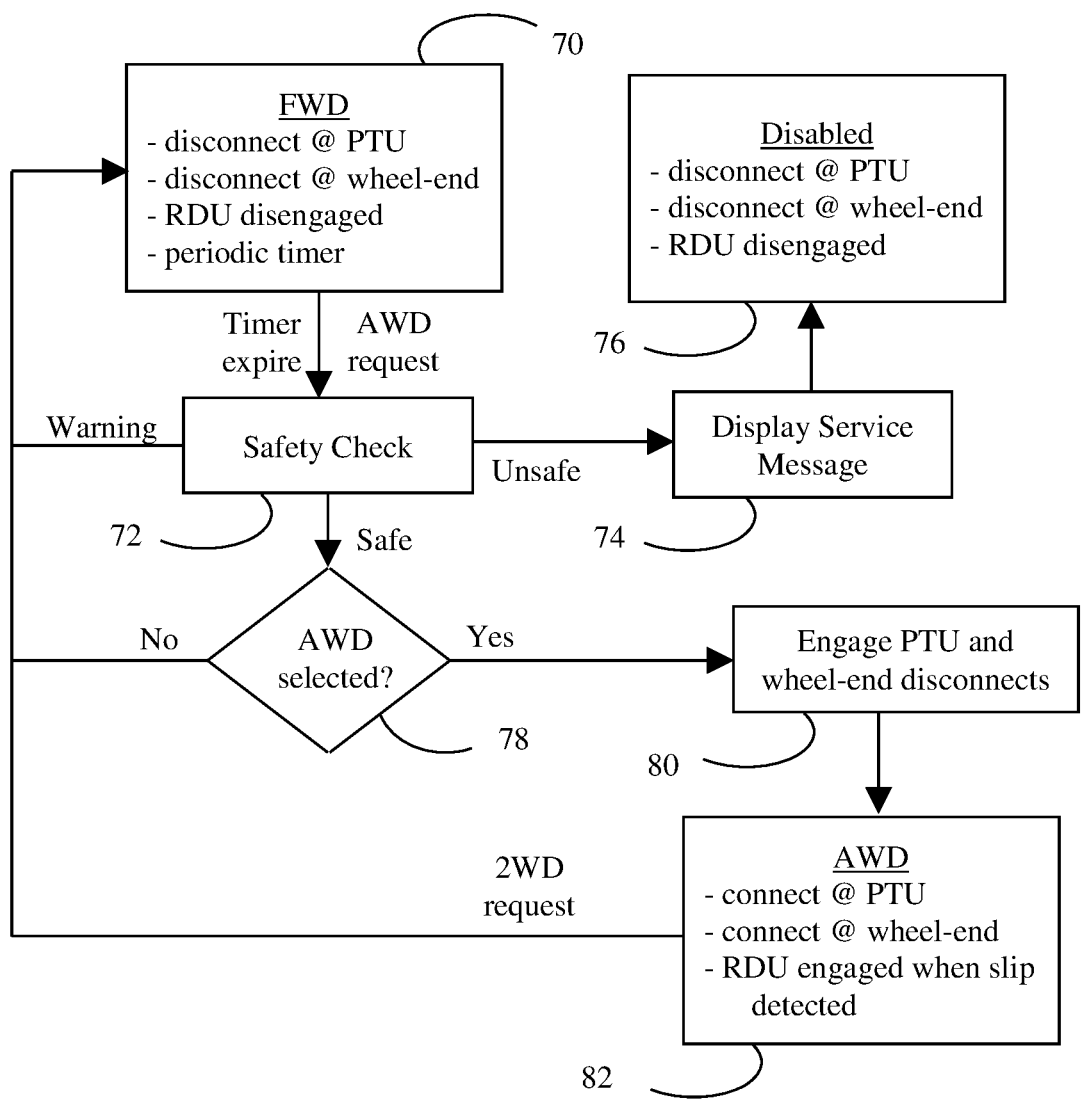
FIG. 3 is a flow chart indicating state transitions for operating the vehicle powertrain of FIG. 1.
Figure 4:
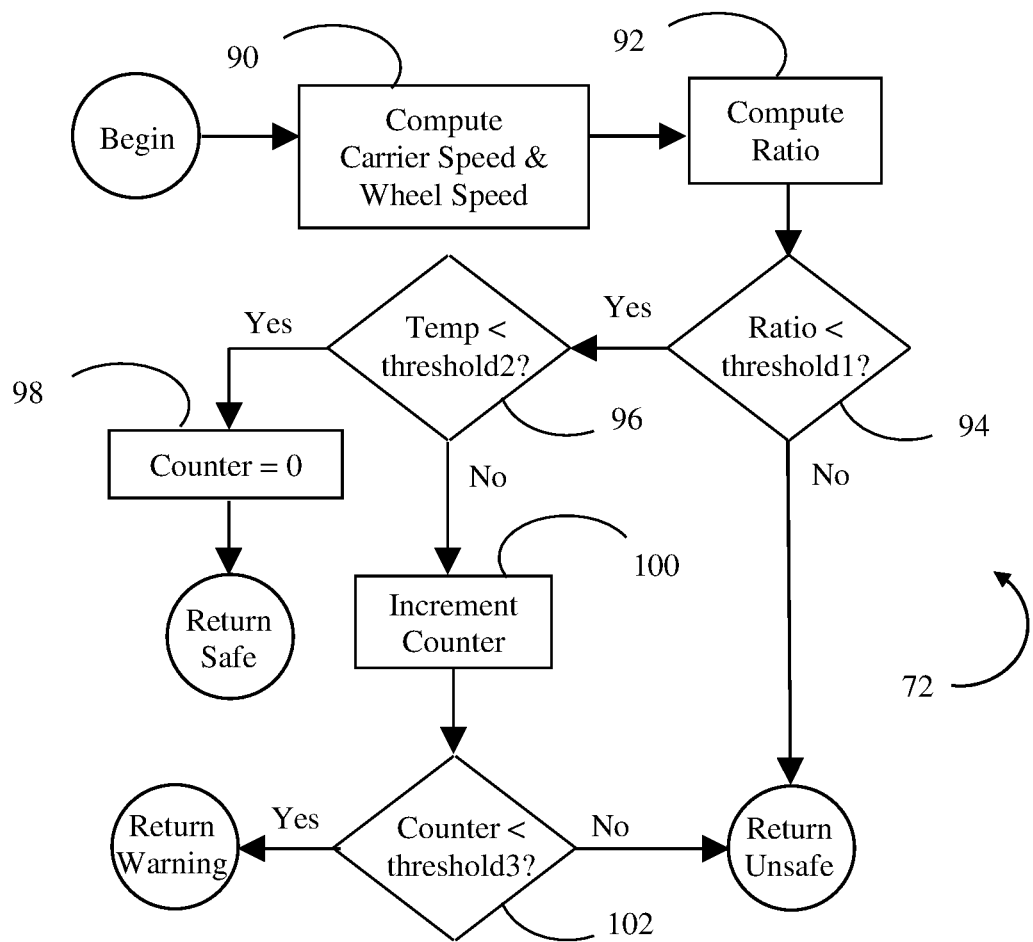
FIG. 4 is a flow chart illustrating a process for completing the safety check in the flow chart of FIG. 3.

FIGS. 3 and 4 illustrate a method of avoiding the vehicle handling effects if the differential fails to differentiate. When the driver selects front wheel drive mode, the vehicle operates in FWD mode at 70. The driveshaft is disconnected at both the PTU and the wheel-end to reduce parasitic drag. The RDU clutch is disengaged. While operating in this mode, a timer is set to expire at regular intervals, such as every 90 seconds. When the timer expired, or when the driver requests activation of the all wheel drive feature, the controller performs a safety check at 72. The details of performing this safety check are discussed below. Three outcomes of the safety check are possible. If the differential appears to be differentiating properly but the fluid temperature indicates a risk of failure, the safety check return Warning and the controller remains in the FWD mode. If the safety check indicates that the differential is Unsafe, a message is displayed to the driver at 74 and the controller enters a Disabled mode at 76. In the Disabled mode, the driveshaft disconnects and RDU continue to operate to provide front wheel drive only. The controller does not exit Disabled mode until service has been performed and the controller is manually reset. If the safety check indicates that the differential is operating normally, the controller checks at 78 whether AWD is selected. If AWD is not selected, implying the safety check was triggered by the timer, then the controller remains in FWD mode. The safety check may not properly detect an unsafe condition when the vehicle is stationary. Running the safety check periodically while the vehicle is moving ensures that any unsafe condition is detected even if the driver requests AWD while the vehicle is stationary. Also, running the safety check periodically provides an opportunity to repeat the safety check if a previous safety check returned Warning. If AWD is selected, then the controller engages the disconnects at 80 and transitions to AWD mode at 82. In AWD mode, the RDU is engaged when front wheel slip is detected to transfer some of the engine power to the rear wheels. The RDU may also be engaged pre-emptively in conditions that are likely to cause front wheel slip, such as a rapid increase in driver demanded power.

FIG. 4 indicates how the safety check is performed. At 90, the controller computes the speed of the differential carrier and wheel 26. At 92, the controller computes the ratio of wheel speed divided by carrier speed. In normal operation, the carrier speed would be zero, so this ratio should be zero. If the differential is failing to differentiate at all, then the ratio will be equal to one. At 94, the controller compares the ratio to a calibratable threshold. If the ratio is less than the calibratable threshold, the safety check returns Unsafe. If the ratio is greater than the threshold, the controller proceeds to check the fluid temperature at 96. If the temperature is below a second calibratable threshold, the controller resets a counter to zero at 98 and returns Safe. If the temperature is above the second threshold, the controller increments the counter at 100. Then, if the counter is less than a third calibratable threshold at 102, the controller return Warning. If the counter is equal to the third threshold, indicating that the fluid temperature has remained above the second threshold for an extended time, the controller returns Unsafe.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
  a differential having an input shaft, a first axle shaft, and a second axle shaft;
  a first wheel fixedly coupled to the first axle shaft;
  a second wheel selectively coupled to the second axle shaft by a clutch;
  a power take-off unit configured to selectively couple a transaxle output to a driveshaft;
  a rear drive unit configured to selectively couple the driveshaft to the differential input shaft; and
  a controller programmed to respond to a request to enter an all wheel drive mode by
    engaging the clutch and power take-off unit only if a ratio of a speed of the input to a speed of the first axle shaft is less than a first threshold and
    inhibiting engagement of the clutch and power take-off unit if the ratio exceeds the first threshold.

2. The vehicle of claim 1 wherein the controller is further programmed to display a message to a driver in response to the ratio being greater than the first threshold.

3. The vehicle of claim 1 wherein the differential also includes a temperature sensor and the controller is further programmed to inhibit engagement of the clutch if the temperature sensor indicates a temperature exceeding a second threshold.

4. The vehicle of claim 3 wherein the controller is further programmed to engage the clutch in response to the temperature sensor indicating that the fluid temperature has decreased to less than the second threshold.

5. The vehicle of claim 4 wherein the controller is further programmed to display a message to a driver in response to the temperature sensor indicating that the fluid temperature has exceeded the second threshold for more than a predetermined amount of time.

6. A method comprising:
  in a front wheel drive mode, disengaging a clutch to decouple a rear wheel from a first rear axle; and
  responding to a request to enter an all wheel drive mode by engaging a power take-off unit to couple a driveshaft to a transaxle output and engaging the clutch only if a ratio of a rear differential input speed to a speed of a second rear axle is less than a threshold.

7. The method of claim 6 further comprising responding to the ratio being greater than the threshold by displaying a message to a driver.

8. The method of claim 6 further comprising responding to the request to enter the all wheel drive mode by engaging the clutch only if a differential fluid temperature is less than a temperature threshold.

9. The method of claim 8 further comprising responding to the fluid temperature decreasing to less than the temperature threshold by engaging the clutch.

10. The method of claim 9 further comprising responding to the fluid temperature exceeding the temperature threshold for more than a predetermined amount of time by displaying a message to a driver.

11. The vehicle of claim 1 wherein the first threshold is between zero and one.

12. The method of claim 6 wherein the threshold is between zero and one.

* * * * *